(12) United States Patent
Omori et al.

(10) Patent No.: US 9,210,433 B2
(45) Date of Patent: Dec. 8, 2015

(54) IMAGE PROCESSING APPARATUS AND IMAGE PROCESSING METHOD

(75) Inventors: Yuji Omori, Kawasaki (JP); Koji Okawa, Kawasaki (JP); Osamu Kawaguchi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 623 days.

(21) Appl. No.: 13/478,767

(22) Filed: May 23, 2012

(65) Prior Publication Data

US 2012/0314765 A1    Dec. 13, 2012

(30) Foreign Application Priority Data

Jun. 13, 2011   (JP) ................. 2011-131636

(51) Int. Cl.
| | | |
|---|---|---|
| *H04N 19/51* | (2014.01) | |
| *H04N 19/167* | (2014.01) | |
| *H04N 19/115* | (2014.01) | |
| *H04N 19/103* | (2014.01) | |
| *H04N 19/14* | (2014.01) | |
| *H04N 19/142* | (2014.01) | |
| *H04N 19/17* | (2014.01) | |

(52) U.S. Cl.
CPC ........... *H04N 19/167* (2014.11); *H04N 19/103* (2014.11); *H04N 19/115* (2014.11); *H04N 19/14* (2014.11); *H04N 19/142* (2014.11); *H04N 19/17* (2014.11)

(58) Field of Classification Search
CPC ........................................................ H04N 7/26
USPC ..................................................... 375/240.08
See application file for complete search history.

(56) References Cited

U.S. PATENT DOCUMENTS

| | | | |
|---|---|---|---|
| 4,951,140 A | 8/1990 | Ueno | ............................. 358/136 |
| 5,819,212 A | 10/1998 | Matsumoto et al. | .......... 704/219 |
| 5,907,361 A | 5/1999 | Okada | ............................ 348/399 |

(Continued)

FOREIGN PATENT DOCUMENTS

| | | |
|---|---|---|
| JP | 2009-005238 | 1/2009 |
| JP | 2009-005239 | 1/2009 |

(Continued)

OTHER PUBLICATIONS

Office Action issued in connection with U.S. Appl. No. 13/485,315 on May 7, 2014.

(Continued)

*Primary Examiner* — Dave Czekaj
*Assistant Examiner* — Kehinde O Abimbola
(74) *Attorney, Agent, or Firm* — Fitzpatrick, Cella, Harper & Scinto (57) ABSTRACT

A specific region in each frame image input after a detection process has been completed a predetermined number of times or more is estimated from a specific region detected from a past frame before the frame. The shift between the specific region detected from a first frame image input after the detection process has been completed the predetermined number of times or more and the specific region estimated for the first frame image is obtained. When the shift falls within a predetermined range, an encoding parameter to encode the specific region estimated for a second frame image input at a point the detection process for the first frame image has been completed with a higher image quality than that of regions other than the specific region is set.

9 Claims, 7 Drawing Sheets

(56) References Cited

U.S. PATENT DOCUMENTS

| | | | |
|---|---|---|---|
| 6,023,301 A | 2/2000 | Katata et al. | 348/586 |
| 6,064,436 A | 5/2000 | Okada | 348/416 |
| 6,895,051 B2 | 5/2005 | Nieweglowski et al. | 375/240.03 |
| 6,931,658 B1 | 8/2005 | Kawamura et al. | 725/94 |
| 7,110,450 B1 | 9/2006 | Kimoto | 375/240 |
| 7,184,604 B2 | 2/2007 | Mizuno et al. | 382/248 |
| 8,130,828 B2 | 3/2012 | Hsu et al. | 375/240.03 |
| 8,155,190 B2 | 4/2012 | Imamura et al. | 375/240.13 |
| 8,204,136 B2 | 6/2012 | Omori | 375/240.27 |
| 8,559,735 B2 | 10/2013 | Sakuyama | 382/233 |
| 2003/0118100 A1* | 6/2003 | Honda et al. | 375/240.08 |
| 2004/0212729 A1 | 10/2004 | Yamaguchi et al. | 348/387.1 |
| 2006/0182350 A1 | 8/2006 | Kondo et al. | 382/232 |
| 2006/0239575 A1 | 10/2006 | Abe et al. | 382/246 |
| 2007/0019083 A1 | 1/2007 | Nakashima | 348/239 |
| 2008/0123745 A1 | 5/2008 | Omori | 375/240.16 |
| 2008/0123972 A1 | 5/2008 | Sekiguchi et al. | 382/232 |
| 2009/0092326 A1 | 4/2009 | Fukuhara et al. | 382/233 |
| 2009/0231453 A1* | 9/2009 | Huang | 348/220.1 |
| 2009/0285498 A1 | 11/2009 | Sakuyama | 382/233 |
| 2010/0189175 A1 | 7/2010 | Fujii et al. | 375/240.03 |
| 2011/0007823 A1* | 1/2011 | Matsuo et al. | 375/240.26 |
| 2011/0255799 A1 | 10/2011 | Omori | 382/248 |
| 2013/0022125 A1 | 1/2013 | Sato | 375/240.16 |

FOREIGN PATENT DOCUMENTS

| | | | | |
|---|---|---|---|---|
| JP | 2009-048620 A | 3/2009 | | G06T 7/20 |
| JP | 2010-0193441 | 9/2010 | | |

OTHER PUBLICATIONS

U.S. Appl. No. 13/456,889, filed Apr. 26, 2012.
U.S. Appl. No. 13/485,315, filed May 31, 2012.
Office Action issued in connection with U.S. Appl. No. 13/485,315 on Oct. 25, 2013.
"Information Technology—Coding of Audio-Visual Objects—Part 2: Visual", ISO/IEC International Standard 14496-2 (MPEG-4 Visual), Second Edition, Dec. 1, 2001.
"Information Technology—Coding of Audio-Visual Objects—Part 10: Advanced Video Encoding", ISO/IEC International Standard 14496-10 (MPEG-4 Advanced Video Coding), First Edition, Dec. 1, 2003.
"Information Technology—Generic Coding of Moving Pictures and Associated Audio Information: Video", ISO/IEC International Standard 13818-2 (MPEG-2), 1995.
"Series H: Audiovisual and Multimedia Systems Infrastructure of Audiovisual Services—Coding of Moving Video", Recommendation ITU-T H.264, Advanced Video Coding for Generic Audiovisual Series (MPEG-4 AVC/H.264), Jun. 2011.
Office Action dated May 15, 2015—JP Application No. 2011-131636.
Notice of Allowance dated Jul. 1, 2015—U.S. Appl. No. 13/485,315.

* cited by examiner

IMAGE PROCESSING APPARATUS AND IMAGE PROCESSING METHOD

BACKGROUND OF THE INVENTION

1. Field of the Invention

The present invention relates to a technique of encoding a specific region of an image to image quality higher than in other regions.

2. Description of the Related Art

An image signal encoding technique is used to transfer or store/reproduce a moving image. As the moving image encoding techniques, international standard encoding methods such as International Standard 13818 (MPEG-2) are known. ISO/IEC International Standard 14496-2 (MPEG-4 Visual), ITU-T Rec. H.264 Advanced Video Coding|ISO/IEC International Standard 14496-10 (MPEG-4 AVC/H.264, to be referred to as H.264 hereinafter), and the like are also known as international standard encoding methods.

These techniques are used in the fields of video camera and recorder as well. In particular, there is recently a vigorous effort going on to apply the techniques to surveillance video cameras (to be referred to as surveillance cameras hereinafter). In application to a surveillance camera, image data is encoded at a relatively low bit rate to suppress the size of encoded data in many cases because of necessity of long-term recording. In the low bit rate encoding, however, a large amount of information is lost, and the image quality degrades. For this reason, the technique cannot function well to achieve the original object of, for example, specifying a human face.

Instead of uniformly encoding the whole scene, there is generally used a technique of detecting a region such as a human face, which is supposed to be important for the application purpose, as a specific region and other regions as nonspecific regions and encoding the specific region to higher image quality while suppressing the code amount only in the nonspecific regions.

In this technique, however, a region that should not be detected actually may erroneously be detected as a specific region because of poor camera performance or quick motion of the detection target object. To solve this problem, for example, Japanese Patent Laid-Open No. 2009-005238 discloses an image encoding method in which the adequacy of a specific region is verified based on its position or a face size, and the quantization value of the specific region is controlled. Japanese Patent Laid-Open No. 2009-005239 also discloses an image encoding method of tracking a detected specific region and correcting the specific region in a frame to be actually encoded.

However, when accurately detecting the specific region, the load of the specific region detection process is heavy. This leads to a delay of several frames in an encoding process until the specific region is detected. The related art does not particularly mention any technique of coping with the delay in specific region detection. The delayed specific region is sometimes different from the specific region in a frame to be actually encoded. Hence, the image quality cannot appropriately be improved by changing the encoding parameter for the delayed specific region. Also considerable is a method of predicting the specific region in a frame to be encoded based on the delayed specific region and changing the encoding parameter for the predicted specific region. However, a wrong region may be predicted as a specific region, and appropriate image quality improvement may be impossible.

SUMMARY OF THE INVENTION

The present invention has been made in consideration of the above-described problems, and provides a technique capable of encoding an intended specific region with a higher image quality than that of other regions without increasing the code amount of a whole scene.

According to one aspect of the present invention, there is provided an image processing apparatus including an input unit that inputs each frame image of a moving image, and an encoding unit that sequentially encodes an image input by the input unit using a set encoding parameter and outputs the image, comprising: a detection unit that operates in parallel to an image input operation of the input unit, the detection unit executing a detection process of detecting, as a specific region, a region of a specific object from a frame image of interest, and when the detection process for the frame image of interest is an nth ($n \geq 1$) detection process, executing an (n+1)th detection process for the frame image input by the input unit at a point of completion of the nth detection process; an estimation unit that estimates the specific region in each frame image input by the input unit after the detection process has been completed not less than a predetermined number of times from the specific region detected from a past frame before the frame; a calculation unit that obtains a shift between the specific region detected by the detection unit from a first frame image input by the input unit after the detection process has been completed not less than the predetermined number of times and the specific region estimated by the estimation unit for the first frame image; and a setting unit that, when the shift falls within a predetermined range, sets, in the encoding unit, an encoding parameter to encode the specific region estimated by the estimation unit for a second frame image input by the input unit at a point the detection process for the first frame image has been completed with a higher image quality than that of regions other than the specific region as an encoding parameter for the second frame image.

According to another aspect of the present invention, there is provided an image processing apparatus including an input unit that inputs each frame image of a moving image, and an encoding unit that sequentially encodes an image input by the input unit using a set encoding parameter and outputs the image, comprising: a detection unit that operates in parallel to an image input operation of the input unit, the detection unit executing a detection process of detecting, as a specific region, a region of a specific object from a frame image of interest, and when the detection process for the frame image of interest is an nth ($n \geq 1$) detection process, executing an (n+1)th detection process for the frame image input by the input unit at a point of completion of the nth detection process; an estimation unit that estimates the specific region in each frame image input by the input unit after the detection process has been completed not less than a predetermined number of times from the specific region detected from a past frame before the frame; a calculation unit that obtains a shift between the specific region detected by the detection unit from a first frame image input by the input unit after the detection process has been completed not less than the predetermined number of times and the specific region estimated by the estimation unit for the first frame image; a correction unit that, when the shift falls outside a predetermined range, corrects, using the shift, the specific region estimated by the estimation unit for a second frame image input by the input unit at a point the detection process for the first frame image has been completed; and a setting unit that sets, in the encoding unit, an encoding parameter to encode the specific region corrected by the correction unit for the second frame image with a higher image quality than that of regions other than the specific region as an encoding parameter for the second frame image.

According to still another aspect of the present invention, there is provided an image processing method to be performed by an image processing apparatus including an input unit that inputs each frame image of a moving image, and an encoding unit that sequentially encodes an image input by the input unit using a set encoding parameter and outputs the image, comprising: a detection step operating in parallel to an image input operation of the input unit, in which a detection process of detecting, as a specific region, a region of a specific object from a frame image of interest is executed, and when the detection process for the frame image of interest is an nth (n≥1) detection process, an (n+1)th detection process is executed for the frame image input by the input unit at a point of completion of the nth detection process; an estimation step of estimating the specific region in each frame image input by the input unit after the detection process has been completed not less than a predetermined number of times from the specific region detected from a past frame before the frame; a calculation step of obtaining a shift between the specific region detected in the detection step from a first frame image input by the input unit after the detection process has been completed not less than the predetermined number of times and the specific region estimated in the estimation step for the first frame image; and a setting step of, when the shift falls within a predetermined range, setting, in the encoding unit, an encoding parameter to encode the specific region estimated in the estimation step for a second frame image input by the input unit at a point the detection process for the first frame image has been completed with a higher image quality than that of regions other than the specific region as an encoding parameter for the second frame image.

According to yet another aspect of the present invention, there is provided an image processing method to be performed by an image processing apparatus including an input unit that inputs each frame image of a moving image, and an encoding unit that sequentially encodes an image input by the input unit using a set encoding parameter and outputs the image, comprising: a detection step operating in parallel to an image input operation of the input unit, in which a detection process of detecting, as a specific region, a region of a specific object from a frame image of interest is executed, and when the detection process for the frame image of interest is an nth (n≥1) detection process, an (n+1)th detection process is executed for the frame image input by the input unit at a point of completion of the nth detection process; an estimation step of estimating the specific region in each frame image input by the input unit after the detection process has been completed not less than a predetermined number of times from the specific region detected from a past frame before the frame; a calculation step of obtaining a shift between the specific region detected in the detection step from a first frame image input by the input unit after the detection process has been completed not less than the predetermined number of times and the specific region estimated in the estimation step for the first frame image; a correction step of, when the shift falls outside a predetermined range, correcting, using the shift, the specific region estimated in the estimation step for a second frame image input by the input unit at a point the detection process for the first frame image has been completed; and a setting step of setting, in the encoding unit, an encoding parameter to encode the specific region corrected in the correction step for the second frame image with a higher image quality than that of regions other than the specific region as an encoding parameter for the second frame image.

Further features of the present invention will become apparent from the following description of exemplary embodiments with reference to the attached drawings.

DESCRIPTION OF THE EMBODIMENTS

The embodiments of the present invention will now be described with reference to the accompanying drawings. Note that each embodiment to be described below is an example of practicing the present invention and one of detailed examples of the arrangements in the appended claims.

First Embodiment

An image processing apparatus according to this embodiment inputs the image of each frame of a moving image, sequentially encodes the input image using a set encoding parameter, and outputs the encoded image. First, an example of the functional arrangement of the image processing apparatus according to the embodiment will be described with reference to the block diagram of FIG. 1.

Figure 1:
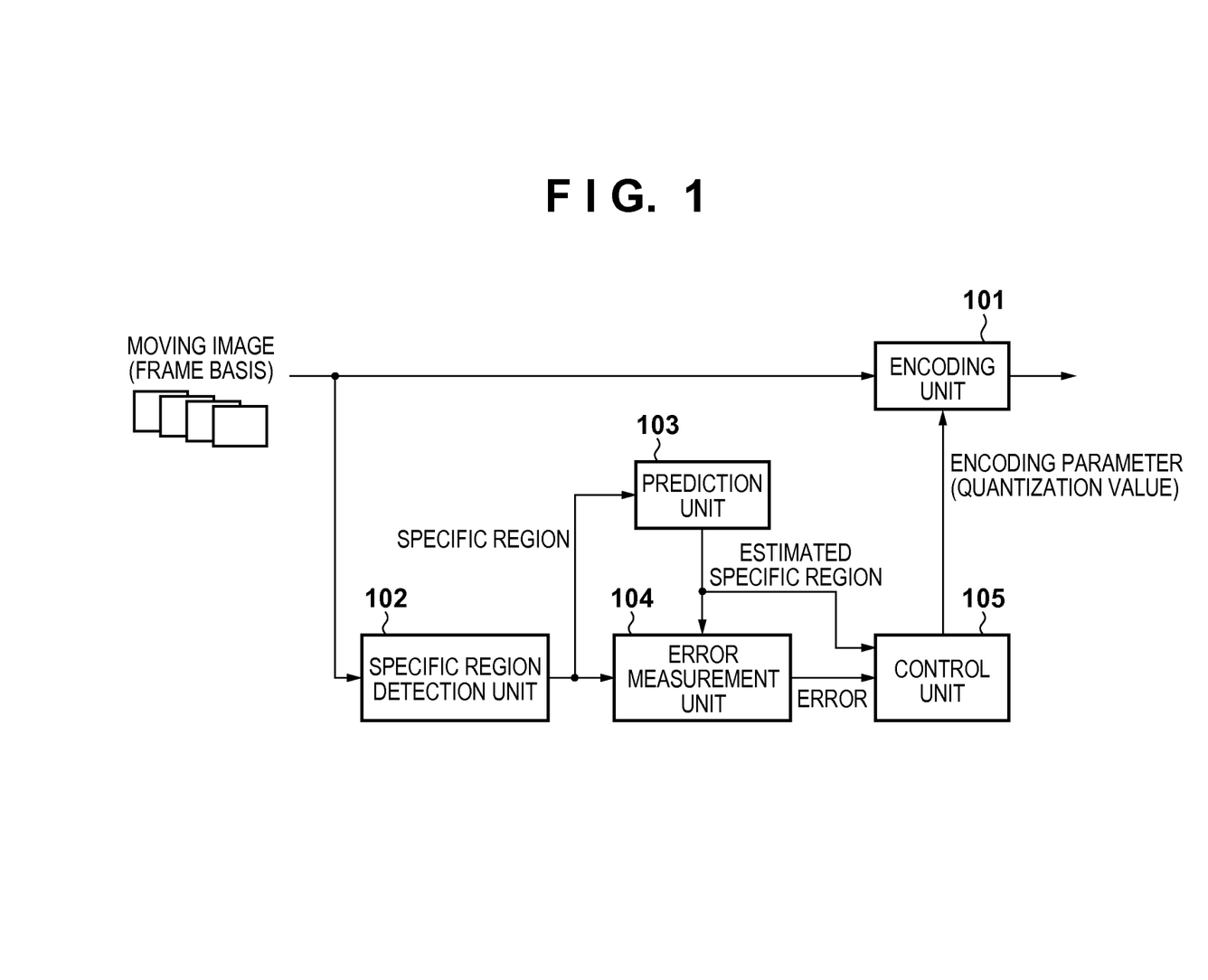
FIG. 1 is a block diagram showing an example of the functional arrangement of an image processing apparatus.

Each frame image of a moving image is input to an encoding unit 101 and a specific region detection unit 102.

The encoding unit 101 encodes each input frame image using an encoding parameter supplied from a control unit 105. In this embodiment, the encoding parameter will be explained as a quantization step. However, any parameter other than the quantization step is also applicable as the encoding parameter. A parameter capable of adjusting the code amount or image quality, such as a quantization table or a filter coefficient that exists depending on the encoding method, is usable. In this embodiment, H.264 is used as the encoding method of the encoding unit 101. However, the encoding method is not limited to this, and, for example, MPEG-2 may be used. The encoding unit 101 outputs the encoding result to an appropriate output destination. The output destination is not particularly limited. The encoding result may be output to an appropriate memory or sent to an external device via a network.

The specific region detection unit 102 detects a region including a specific object from the input image as a specific region. The definition of the specific region is not particularly limited. The specific region need only be a region such as a human face or a human body that should be in high resolution, or a region such as an animal face or the license plate of a car that is regarded as important in certain use case. The specific region detection unit 102 sends information (for example, the coordinate positions of the upper left and lower right corners of the specific region or the coordinate positions of the upper left corner and the vertical and horizontal sizes of the specific region) to be used to specify the specific region of the image to a prediction unit 103 and an error measurement unit 104 as region information.

Note that the specific region detection unit 102 operates in parallel to image input to the apparatus and takes a time corresponding to several frames to detect the specific region. When the detection process is completed in a given frame image, the specific region detection unit 102 executes the detection process anew for a frame image input to the apparatus at the time of completion. As a consequence, the specific region detection by the specific region detection unit 102 is done only once in several frames. The process by the specific region detection unit 102 can be generalized in the following way. When a detection process of detecting a specific region in a frame of interest is the nth (n≥1) detection process, the specific region detection unit 102 executes the (n+1)th detection process for a frame image input to the apparatus at the time of completion of the nth detection process.

The prediction unit 103 predicts (estimates), from the specific regions detected in past frames before the frame of interest, the specific region of each frame image input to the apparatus after the specific region detection unit 102 has completed the detection process a predetermined number of times or more. The estimated specific region will be referred to as an estimated specific region hereinafter. The prediction unit 103 sends information (for example, the coordinate positions of the upper left and lower right corners of the estimated specific region or the coordinate positions of the upper left corner and the vertical and horizontal sizes of the estimated specific region) to be used to specify the estimated specific region of the image to the control unit 105 and the error measurement unit 104 as region information.

The error measurement unit 104 calculates the error (shift) between a specific region extracted by the specific region detection unit 102 from an image (first frame image) input to the apparatus after the detection process performed the predetermined number of times or more and an estimated specific region predicted for the first frame image by the prediction unit 103. The error measurement unit 104 sends the calculated error to the control unit 105.

The control unit 105 decides the encoding parameter based on the error from the error measurement unit 104 and sets the decided encoding parameter in the encoding unit 101. Assume that the image input to the apparatus at the time of completion of the detection process performed by the specific region detection unit 102 for the first frame image is a second frame image, and the above-described error calculated for the first frame image falls within a predetermined range. In this case, the encoding parameter to be used to encode the estimated specific region predicted for the second frame image by the prediction unit 103 with a higher image quality than that of the regions other than the estimated specific region is set in the encoding unit 101 as the encoding parameter for the second frame image.

In this embodiment, a quantization step is used as the encoding parameter, as described above. Hence, the control unit 105 sets the quantization step for the estimated specific region of the second frame image to be smaller than the quantization step for the regions other than the estimated specific region. This process enables to suppress the bit rate to a desired value while improving the image quality of a region such as a human face or a human body which is supposed to be important.

Note that the control unit 105 controls the operations of various units included in the image processing apparatus in addition to the above-described operation.

An encoding process to be performed by the image processing apparatus according to this embodiment will be explained next with reference to the flowcharts of FIGS. 2A and 2B.

In step S201, the control unit 105 initializes a variable N representing the number of the frame as the current process target to 1, a variable i representing the number of times of completion of the specific region detection process (the number of frames in which a specific region is detected) to 0, and a variable ready to be described later to 1.

In step S202, the control unit 105 initializes a variable detect_flag representing whether the specific region detection unit 102 has output a specific region to 0.

In step S203, the control unit 105 determines whether the value of the variable ready is 1. This determination process is performed to determine whether the specific region detection unit 102 is currently ready to execute the specific region detection process. Since the specific region detection unit 102 cannot process a plurality of frames simultaneously, the detection process is performed for only one frame. Only after the detection process for the one frame is completed, the next detection process starts for the frame input to the apparatus at the time of completion. If the value of ready is 1, the specific region detection unit 102 is not currently executing the specific region detection process and is ready to perform the specific region detection process. On the other hand, if the value of ready is 0, the specific region detection unit 102 is currently executing the specific region detection process and is not ready to perform the specific region detection process.

Upon determining that the value of ready is 1, the process advances to step S204. If the value of ready is 0, the process advances to step S207. In step S204, the control unit 105 sets the value of the variable N representing the number of the frame as the current process target to a variable detect_frame_num representing the number of the frame that is going to undergo the specific region detection by the specific region detection unit 102.

In step S205, the specific region detection unit 102 starts the process (detection process) of detecting a specific region from the frame image represented by detect_frame_num. As described above, this detection process takes a time corresponding to several frames. During the process, subsequent frames are sequentially input to the apparatus.

In step S206, the control unit 105 sets 0 to the variable ready. In step S207, the specific region detection unit 102 determines whether the detection process that has started in step S205 is completed. Upon determining that the detection process is completed, the process advances to step S208. If the detection process is not completed, the process advances to step S213.

In step S208, the control unit 105 sets 1 to the variable ready. That is, since the specific region detection process in the frame represented by detect_frame_num is completed, the specific region detection unit 102 is currently ready to perform the specific region detection process.

In step S209, the specific region detection unit 102 sends the region information of the detected specific region to the prediction unit 103 and the error measurement unit 104. In step S210, the prediction unit 103 sets the value of the variable detect_frame_num to a sequence P[i]. This sequence stores the number of the frame in which the specific region has been detected. P[i]=j indicates that the frame that has undergone the ith detection process is the jth frame.

In step S211, the control unit 105 increments the value of the variable i by one. In step S212, the control unit 105 sets 1 to the variable detect_flag. In step S213, the control unit 105 determines whether the value of the variable i is 2 or more, that is, whether specific regions have been detected in two or more past frames before the Nth frame. Upon determining that i≥2, the process advances to step S214. If i<2, the process advances to step S224.

In step S214, the prediction unit 103 predicts (estimates) the specific region in the Nth frame image using the region information of the specific region detected by the specific region detection unit 102 from each of the P[i−2]th frame image and the P[i−1]th frame image. In this embodiment, the specific region in the current frame is predicted using the detection results in two past frames. However, the specific region in the current frame may be predicted using the detection results in M (M>2) past frames. In this case, in step S213, the control unit 105 determines whether the value of the variable i is M or more. If i≥M, the process advances to step S214. If i<M, the process advances to step S224.

Figure 2A:
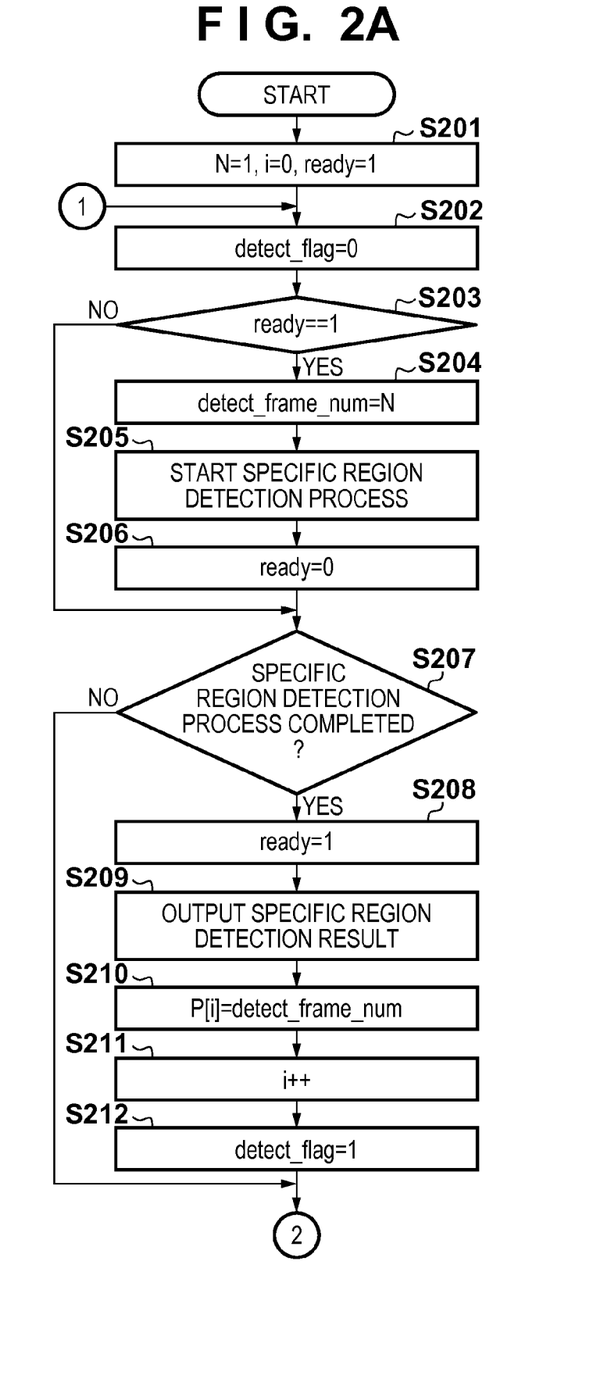
FIGS. 2A and 2B are flowcharts of an encoding process to be performed by the image processing apparatus.
Figure 2B:
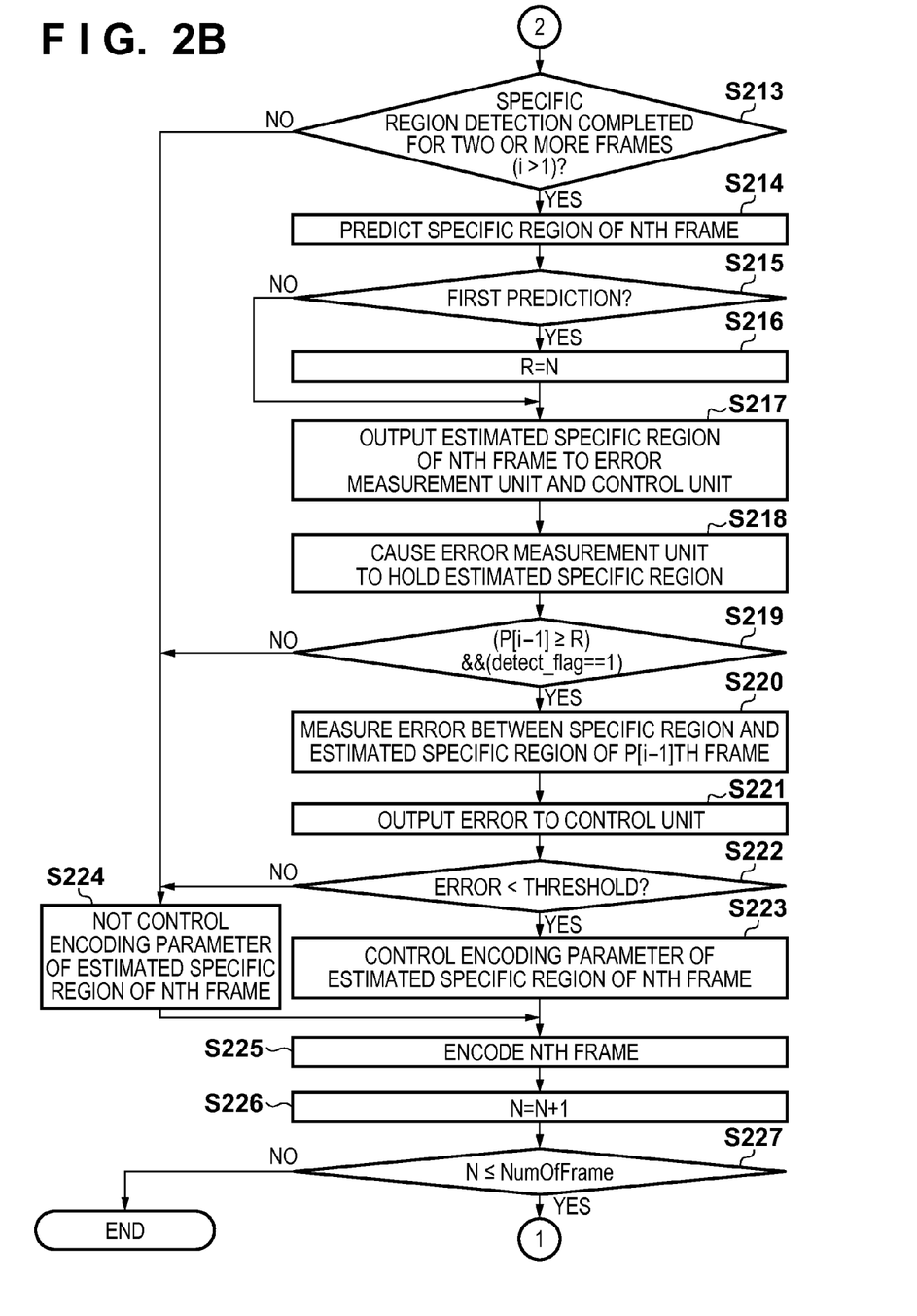

In step S215, the control unit 105 determines whether the prediction in step S214 is the prediction performed for the first time after the process of the flowcharts of FIGS. 2A and 2B has started. Upon determining that the prediction in step S214 is the prediction performed for the first time, the process advances to step S216. If the prediction is the second or subsequent prediction, the process advances to step S217.

In step S216, the control unit 105 sets the value of the variable N representing the current frame number to a variable R. In step S217, the prediction unit 103 sends the result of the prediction in step S214, that is, the region information of the estimated specific region in the Nth frame image to the error measurement unit 104 and the control unit 105.

In step S218, the error measurement unit 104 stores the region information received from the prediction unit 103 in the memory of the apparatus. In step S219, the control unit 105 determines whether the conditions P[i−1]≥R and variable detect_flag=1 are satisfied. Upon determining that the conditions are satisfied, the process advances to step S220. If the conditions are not satisfied, the process advances to step S224.

In step S220, the error measurement unit 104 calculates the error between the region information of the specific region detected by the specific region detection unit 102 for the P[i−1]th frame image and the region information of the estimated specific region predicted by the prediction unit 103 for the P[i−1]th frame image. For example, the positional shift or size shift between the specific region and the estimated specific region in the image is obtained as the error. Note that the error measurement unit 104 may hold the region information of the estimated specific region and measures the error between it and the region information of the specific region output from the specific region detection unit 102. The region information of the estimated specific region may be held by the prediction unit 103, as a matter of course. The prediction unit 103 may output the region information of the estimated specific region to the error measurement unit 104 as needed.

In step S221, the error measurement unit 104 sends the error obtained in step S220 to the control unit 105. In step S222, the control unit 105 determines whether the error received from the error measurement unit 104 falls within a predetermined range. Upon determining that the error falls within the predetermined range, the process advances to step S223. If the error falls outside the predetermined range, the process advances to step S224. The predetermined range can be either a fixed range or a range that adaptively changes.

In step S223, the control unit 105 generates, as the encoding parameter for the Nth frame image, an encoding parameter to encode the estimated specific region estimated for the Nth frame image in step S217 with a higher image quality than that of the regions other than the estimated specific region. The control unit 105 sets the generated encoding parameter in the encoding unit 101. In this embodiment, a quantization step is used as the encoding parameter. Hence, the quantization step for the estimated specific region estimated for the Nth frame image is set to be smaller than the quantization step for the regions other than the estimated specific region. Note that the encoding parameter for the estimated specific region may be controlled independently of whether the error falls within the predetermined range.

In step S224, the control unit 105 generates an encoding parameter to encode every region of the Nth frame image with the same image quality and sets the generated encoding parameter in the encoding unit 101. In this embodiment, the same quantization step is set for the Nth frame image.

In step S225, the encoding unit 101 generates encoded data by encoding the Nth frame image using the encoding parameter set by the control unit 105 and outputs the generated encoded data to an appropriate output destination.

In step S226, the control unit 105 increments the value of the variable N by one to process the next frame.

In step S227, the control unit 105 determines whether the value of the variable N is equal to or smaller than the value of the total number NumOfFrame of frames of the moving image. Upon determining that N≤NumOfFrame, the process returns to step S202 to perform the subsequent process for the next frame image. If N>NumOfFrame, the process of the flowcharts of FIGS. 2A and 2B ends.

Figure 5:
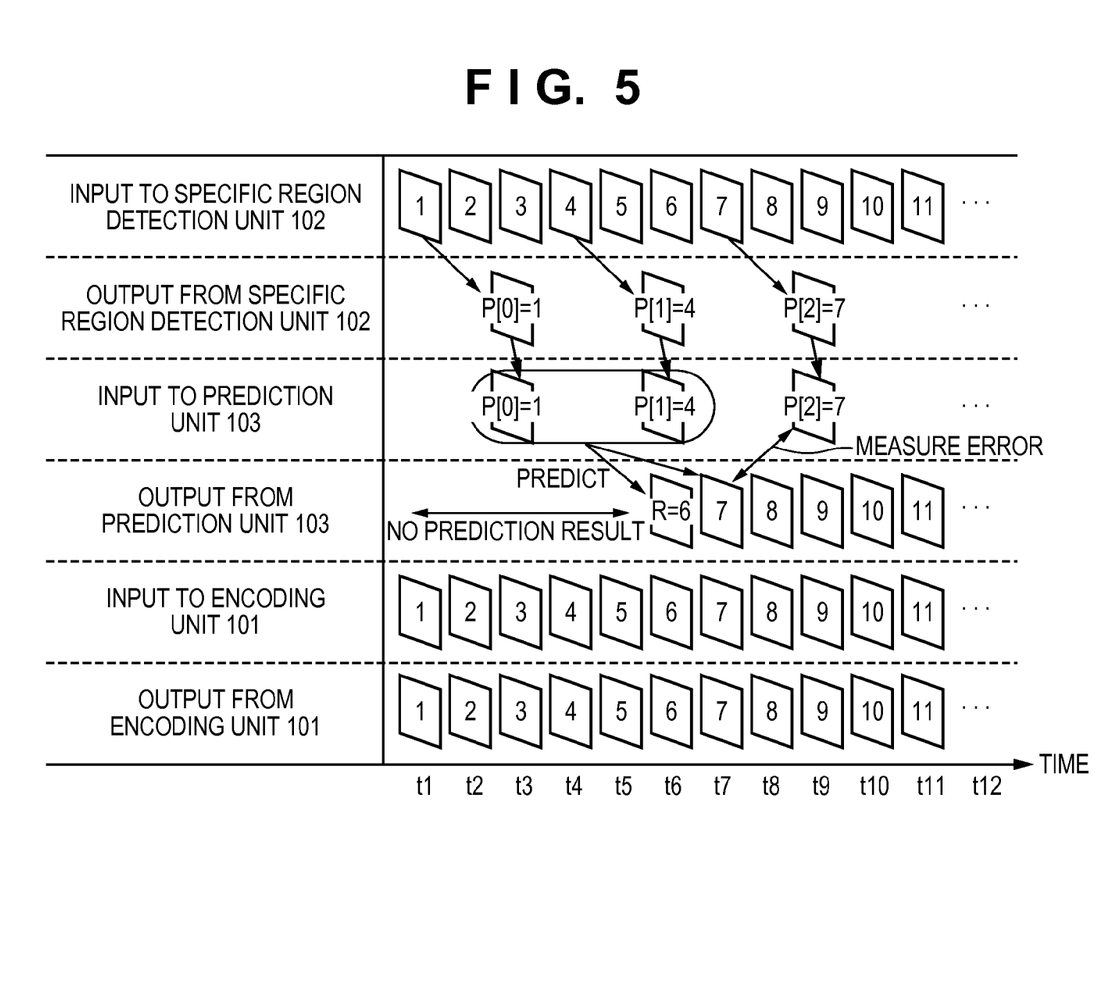
FIG. 5 is a view showing a detailed example of the encoding process.

The process of the flowcharts of FIGS. 2A and 2B will be described next using a detailed example shown in FIG. 5. In the detailed example of FIG. 5, images having frame numbers=1, 2, . . . , 11, . . . are sequentially input to the specific region detection unit 102 and the encoding unit 101.

The encoding operation at time t1 will be described. At the time t1, an image having a frame number=1 is input to the specific region detection unit 102 and the encoding unit 101. In step S201, initialization is performed to set N=1, i=0, and ready=1. In step S202, initialization is performed set to detect_flag=0. Since ready=1 at this point, the process advances from step S203 to step S204. In step S204, N (=1) is set to detect_frame_num. In step S205, the specific region detection process for the frame image represented by detect_frame_num (=1) starts. In step S206, ready=0 is set. As shown in FIG. 5, the specific region detection unit 102 receives the first frame image and starts the specific region detection process for this image. This detection process is completed at time t3. Since the specific region detection process for the first frame image is not yet completed in step S207 at the time t1, the process advances from step S207 to step S213. Since no specific region has been detected from any frame (i=0<2) at this point, the process advances from step S213 to step S224. In step S224, an encoding parameter to obtain uniform image quality all over the image is set as the encoding parameter for the first frame image. In step S225, the first frame image is encoded using the encoding parameter. In step S226, the value of the variable N is incremented by one. Since N (=2) is equal to or smaller than NumOfFrame (at least larger than 11 in FIG. 5) at this point, the process returns from step S227 to step S202 (the time changes to t2 at this point). From step S202, the subsequent process is performed for the Nth (=2nd) frame image.

The encoding operation at the time t2 will be described next. At the time t2, an image having a frame number=2 is input to the specific region detection unit 102 and the encoding unit 101. In step S202, initialization is performed to set detect_flag=0. Since the value of ready remains unchanged at 0 through the process up to this point, the process advances from step S203 to step S207. Since the specific region detection process for the first frame image is not completed yet in step S207 at the time t2, as described above, the process advances from step S207 to step S213. Since no specific region has been detected from any frame (i=0<2) at this point, the process advances from step S213 to step S224. In step S224, an encoding parameter to obtain uniform image quality all over the image is set as the encoding parameter for the second frame image. In step S225, the second frame image is encoded using the encoding parameter. In step S226, the value of the variable N is incremented by one. Since N (=3) is equal to or smaller than NumOfFrame (at least larger than 11 in FIG. 5) at this point, the process returns from step S227 to step S202 (the time changes to t3 at this point). From step S202, the subsequent process is performed for the Nth (=3rd) frame image.

The encoding operation at the time t3 will be described next. At the time t3, an image having a frame number=3 is input to the specific region detection unit 102 and the encoding unit 101. In step S202, initialization is performed to set detect_flag=0. Since the value of ready remains unchanged at 0 through the process up to this point, the process advances from step S203 to step S207. Since the specific region detection process for the first frame image is completed at the time t3, as described above, the process advances from step S207 to step S208. In step S208, ready=1 is set. In step S209, the region information of the specific region detected from the first frame image is sent to the prediction unit 103 and the error measurement unit 104. In step S210, since i=0, and detect_frame_num=1, P[0]=1 is set. In step S211, the value of i is incremented by one to set i=1. In step S212, detect_flag=1 is set. Since the specific region has been detected from only one frame (i=1<2) at this point, the process advances from step S213 to step S224. In step S224, an encoding parameter to obtain uniform image quality all over the image is set as the encoding parameter for the third frame image. In step S225, the third frame image is encoded using the encoding parameter. In step S226, the value of the variable N is incremented by one. Since N (=4) is equal to or smaller than NumOfFrame (at least larger than 11 in FIG. 5) at this point, the process returns from step S227 to step S202 (the time changes to t4 at this point). From step S202, the subsequent process is performed for the Nth (=4th) frame image.

The encoding operation at the time t4 will be described next. At the time t4, an image having a frame number=4 is input to the specific region detection unit 102 and the encoding unit 101. In step S202, initialization is performed to set detect_flag=0. Since ready=1 at this point, the process advances from step S203 to step S204. In step S204, N (=4) is set to detect_frame_num. In step S205, the specific region detection process for the frame image represented by detect_frame_num (=4) starts. In step S206, ready=0 is set. As shown in FIG. 5, the specific region detection unit 102 receives the fourth frame image and starts the specific region detection process for this image. This detection process is completed at time t6. Since the specific region detection process for the fourth frame image is not completed yet in step S207 at the time t4, the process advances from step S207 to step S213. Since the specific region has been detected from only the first frame (i=1<2) at this point, the process advances from step S213 to step S224. In step S224, an encoding parameter to obtain uniform image quality all over the image is set as the encoding parameter for the fourth frame image. In step S225, the fourth frame image is encoded using the encoding parameter. In step S226, the value of the variable N is incremented by one. Since N (=5) is equal to or smaller than NumOfFrame (at least larger than 11 in FIG. 5) at this point, the process returns from step S227 to step S202 (the time changes to t5 at this point). From step S202, the subsequent process is performed for the Nth (=5th) frame image.

The encoding operation at the time t5 will be described next. At the time t5, an image having a frame number=5 is input to the specific region detection unit 102 and the encoding unit 101. In step S202, initialization is performed to set detect_flag=0. Since the value of ready remains unchanged at 0 through the process up to this point, the process advances from step S203 to step S207. Since the specific region detection process for the fourth frame image is not completed yet in step S207 at the time t5, as described above, the process advances from step S207 to step S213. Since the specific region has been detected from only the first frame image (i=1<2) at this point, the process advances from step S213 to step S224. In step S224, an encoding parameter to obtain uniform image quality all over the image is set as the encoding parameter for the fifth frame image. In step S225, the fifth frame image is encoded using the encoding parameter. In step S226, the value of the variable N is incremented by one. Since N (=6) is equal to or smaller than NumOfFrame (at least larger than 11 in FIG. 5) at this point, the process returns from step S227 to step S202 (the time changes to t6 at this point). From step S202, the subsequent process is performed for the Nth (=6th) frame image.

The encoding operation at the time t6 will be described next. At the time t6, an image having a frame number=6 is input to the specific region detection unit 102 and the encoding unit 101. In step S202, initialization is performed to set detect_flag=0. Since the value of ready remains unchanged at 0 through the process up to this point, the process advances from step S203 to step S207. Since the specific region detection process for the fourth frame image is completed at the time t6, the process advances from step S207 to step S208. In step S208, ready=1 is set. In step S209, the region information of the specific region detected from the fourth frame image is sent to the prediction unit 103 and the error measurement unit 104. In step S210, since i=1, and detect_frame_num=4, P[1]=4 is set. In step S211, the value of i is incremented by one to set i=2. In step S212, detect_flag=1 is set. Since the specific regions have been detected from two frame images, that is, the first and fourth frame images (i=2≥2) at this point, the process advances from step S213 to step S214. In step S214, the specific region in the Nth (=6th) frame image is predicted (estimated) using the region information of the specific region detected from each of the P[i−2]th (=1st) frame image and the P[i−1]th (=4th) frame image. Since this prediction is the first prediction, the process advances from step S215 to step S216. In step S216, N (=6) is set to the variable R. In step S217, the result of the prediction in step S214, that is, the region information of the estimated specific region in the sixth frame image is sent to the error measurement unit 104 and the control unit 105. In step S218, the region information is stored in the memory of the apparatus. In step S219, it is determined whether the conditions P[i−1]≥R and variable detect_flag=1 are satisfied. Since P[i−1]=4, and R=6, the conditions are not satisfied. Hence, the process advances to step S224. In step S224, an encoding parameter to obtain uniform image quality all over the image is set as the encoding parameter for the sixth frame image. In step S225, the sixth frame image is encoded using the encoding parameter. In step S226, the value of the variable N is incremented by one. Since N (=7) is equal to or smaller than NumOfFrame (at least larger than 11 in FIG. 5) at this point, the process returns from step S227 to step S202 (the time changes to t7 at this point). From step S202, the subsequent process is performed for the Nth (=7th) frame image.

The encoding operation at the time t7 will be described next. At the time t7, an image having a frame number=7 is input to the specific region detection unit 102 and the encoding unit 101. In step S202, initialization is performed to set detect_flag=0. Since ready=1 at this point, the process advances from step S203 to step S204. In step S204, N (=7) is set to detect_frame_num. In step S205, the specific region detection process for the frame image represented by detect_frame_num (=7) starts. In step S206, ready=0 is set. As shown in FIG. 5, the specific region detection unit 102 receives the seventh frame image and starts the specific region detection process for this image. This detection process is completed at time t9. Since the specific region detection process for the seventh frame image is not completed yet in step S207 at the time t7, the process advances from step S207 to step S213. Since the specific regions have been detected from two frame images, that is, the first and fourth frame images (i=2≥2) at this point, the process advances from step S213 to step S214. In step S214, the specific region in the Nth (=7th) frame image is predicted (estimated) using the region information of the specific region detected from each of the P[i−2]th (=1st) frame image and the P[i−1]th (=4th) frame image. Since this prediction is not the first prediction, the process advances from step S215 to step S217. In step S217, the result of the prediction in step S214, that is, the region information of the estimated specific region in the seventh frame image is sent to the error measurement unit 104 and the control unit 105. In step S218, the region information is stored in the memory of the apparatus. In step S219, it is determined whether the conditions P[i−1]≥R and variable detect_flag=1 are satisfied. Since P[i−1]=4, and R=6, the conditions are not satisfied. Hence, the process advances to step S224. In step S224, an encoding parameter to obtain uniform image quality all over the image is set as the encoding parameter for the seventh frame image. In step S225, the seventh frame image is encoded using the encoding parameter. In step S226, the value of the variable N is incremented by one. Since N (=8) is equal to or smaller than NumOfFrame (at least larger than 11 in FIG. 5) at this point, the process returns from step S227 to step S202 (the time changes to t8 at this point). From step S202, the subsequent process is performed for the Nth (=8th) frame image.

The encoding operation at the time t8 will be described next. At the time t8, an image having a frame number=8 is input to the specific region detection unit 102 and the encoding unit 101. In step S202, initialization is performed to set detect_flag=0. Since the value of ready remains unchanged at 0 through the process up to this point, the process advances from step S203 to step S207. Since the specific region detection process for the seventh frame image is not completed yet in step S207 at the time t8, the process advances from step S207 to step S213. Since the specific regions have been detected from two frame images, that is, the first and fourth frame images (i=2≥2) at this point, the process advances from step S213 to step S214. In step S214, the specific region in the Nth (=8th) frame image is predicted (estimated) using the region information of the specific region detected from each of the P[i−2]th (=1st) frame image and the P[i−1]th (=4th) frame image. Since this prediction is not the first prediction, the process advances from step S215 to step S217. In step S217, the result of the prediction in step S214, that is, the region information of the estimated specific region in the eighth frame image is sent to the error measurement unit 104 and the control unit 105. In step S218, the region information is stored in the memory of the apparatus. In step S219, it is determined whether the conditions P[i−1]≥R and variable detect_flag=1 are satisfied. Since P[i−1]=4, and R=6, the conditions are not satisfied. Hence, the process advances to step S224. In step S224, an encoding parameter to obtain uniform image quality all over the image is set as the encoding parameter for the eighth frame image. In step S225, the eighth frame image is encoded using the encoding parameter. In step S226, the value of the variable N is incremented by one. Since N (=9) is equal to or smaller than NumOfFrame (at least larger than 11 in FIG. 5) at this point, the process returns from step S227 to step S202 (the time changes to t9 at this point). From step S202, the subsequent process is performed for the Nth (=9th) frame image.

The encoding operation at the time t9 will be described next. At the time t9, an image having a frame number=9 is input to the specific region detection unit 102 and the encoding unit 101. In step S202, initialization is performed to set detect_flag=0. Since the value of ready remains unchanged at 0 through the process up to this point, the process advances from step S203 to step S207. Since the specific region detection process for the seventh frame image is completed at the time t9, the process advances from step S207 to step S208. In step S208, ready=1 is set. In step S209, the region information of the specific region detected from the seventh frame image is sent to the prediction unit 103 and the error measurement unit 104. In step S210, since i=2, and detect_frame_num=7, P[2]=7 is set. In step S211, the value of i is incremented by one to set i=3. In step S212, detect_flag=1 is set. Since the specific regions have been detected from two or more frame images, that is, the first, fourth, and seventh frame images (i=3≥2) at this point, the process advances from step S213 to step S214. In step S214, the specific region in the Nth (=9th) frame image is predicted (estimated) using the region information of the specific region detected from each of the P[i−2]th (=4th) frame image and the P[i−1]th (=7th) frame image. Since this prediction is not the first prediction, the process advances from step S215 to step S217. In step S217, the result of the prediction in step S214, that is, the region information of the estimated specific region in the ninth frame image is sent to the error measurement unit 104 and the control unit 105. In step S218, the region information is stored in the memory of the apparatus. In step S219, it is determined whether the conditions P[i−1]≥R and variable detect_flag=1 are satisfied. Since P[i−1]=7, R=6, and detect_flag=1, the conditions are satisfied. Hence, the process advances to step S220. In step S220, the error between the region information of the specific region detected for the P[i−1]th (=7th) frame image and the region information of the estimated specific region detected for the P[i−1]th (=7th) frame image is calculated. In step S221, the error obtained in step S220 is sent to the control unit 105. In step S222, it is determined whether the error falls within a predetermined range. Upon determining that the error falls within the predetermined range, the process advances to step S223. If the error falls outside the predetermined range, the process advances to step S224. In step S223, an encoding parameter to encode the estimated specific region estimated for the Nth (=9th) frame image in step S217 with a higher image quality than that of regions other than the estimated specific region is generated as the encoding parameter for the Nth (=9th) frame image. The generated encoding parameter is set in the encoding unit 101. In step S224, an encoding parameter to obtain uniform image quality all over the image is set as the encoding parameter for the ninth frame image. In step S225, the ninth frame image is encoded using the encoding parameter set in step S223 or step S224. In step S226, the value of the variable N is incremented by one. Since N (=10) is equal to or smaller than NumOfFrame (at least larger than 11 in FIG. 5) at this point, the process returns from step S227 to step S202 (the time changes to t10 at this point). From step S202, the similar process is performed for the Nth (=10th) frame image.

As described above, according to this embodiment, the encoding parameter can be controlled in accordance with the correctness of specific region prediction. This allows to more accurately increase the image quality of the specific region.

Second Embodiment

An example of the functional arrangement of an image processing apparatus according to this embodiment will be described with reference to the block diagram of FIG. 3. Note that the same reference numerals as in FIG. 1 denote the same constituent elements in FIG. 3, and a description thereof will be omitted.

A prediction unit 303 performs a predictive process described as a process to be performed by the prediction unit 103, and corrects the predicted specific region using an error obtained by an error measurement unit 304. This correction is a correction process of, for example, shifting the position of the predicted specific region by an amount corresponding to the error or deforming the specific region by an amount corresponding to the error. The error measurement unit 304 sends the obtained error not only to a control unit 105 but also to the prediction unit 303.

Figure 4A:
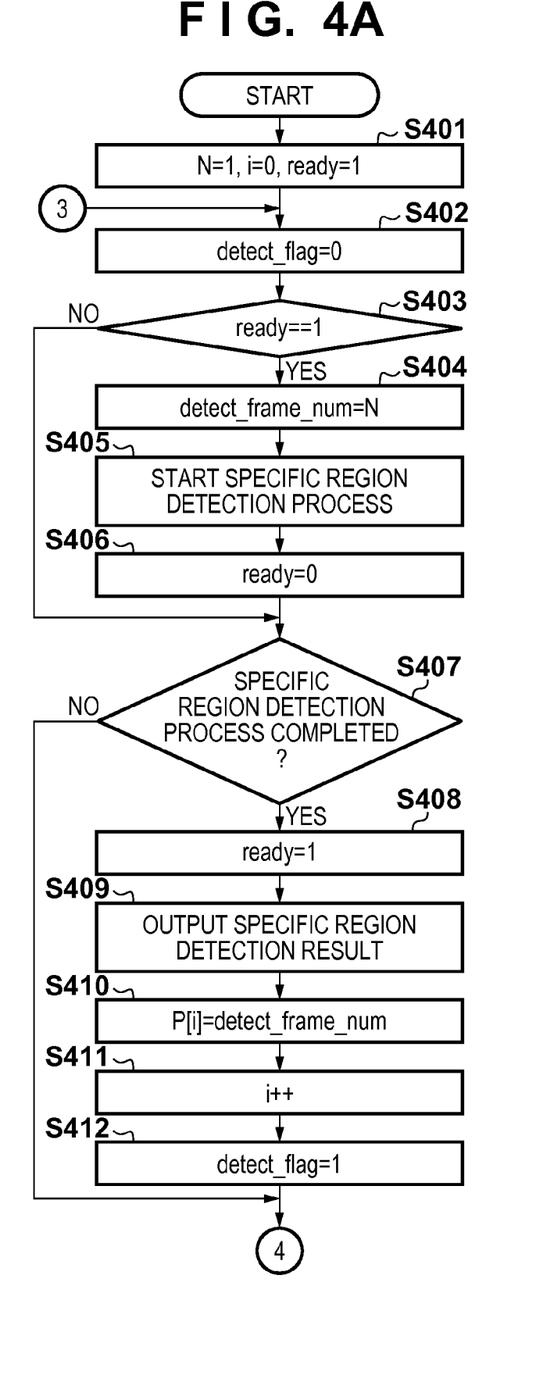
FIGS. 4A and 4B are flowcharts of an encoding process to be performed by the image processing apparatus.
Figure 4B:
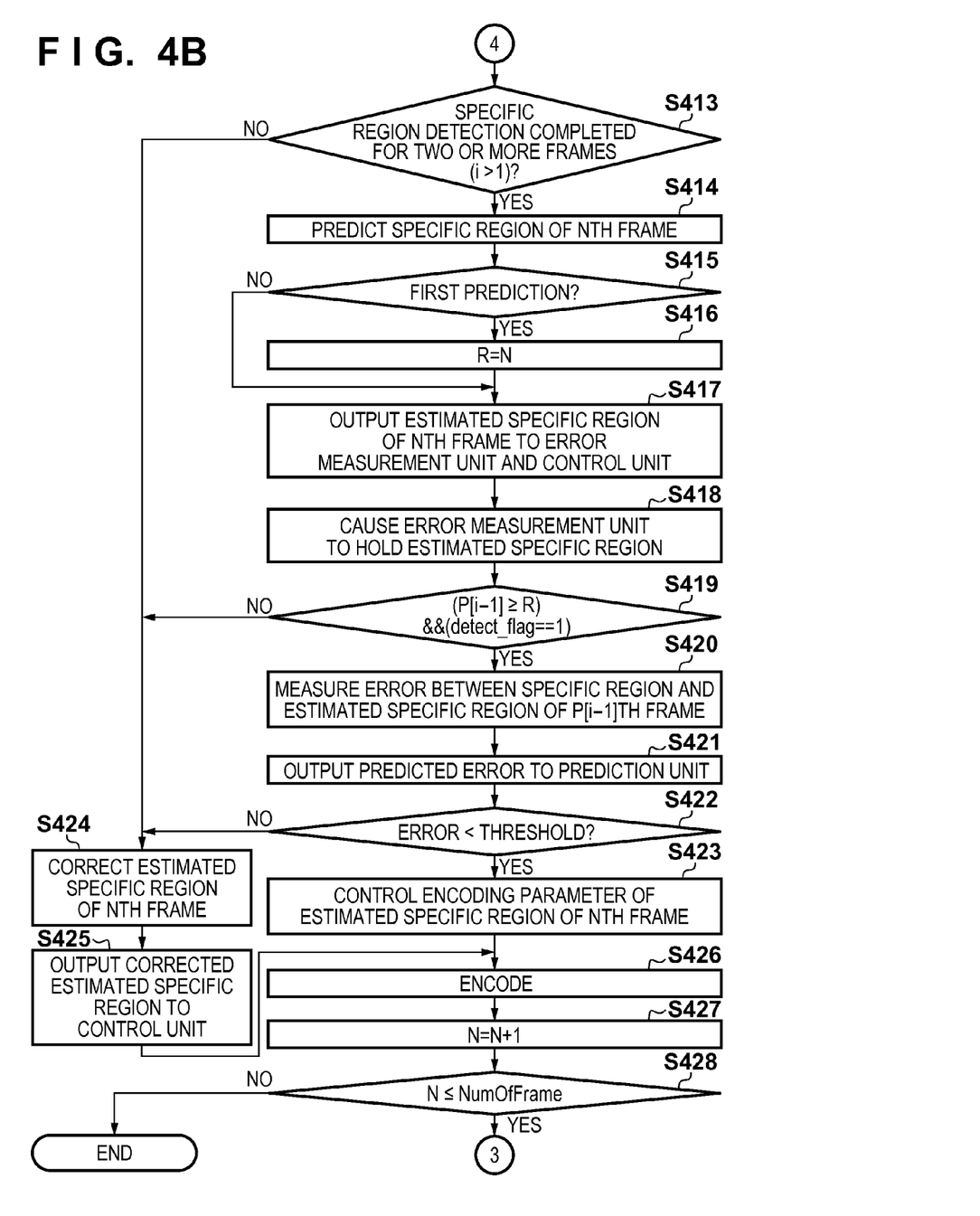

An encoding process to be performed by the image processing apparatus according to this embodiment will be explained next with reference to the flowcharts of FIGS. 4A and 4B. Note that steps S401 to S420 are the same as steps S201 to S220 of FIGS. 2A and 2B, and a description thereof will be omitted.

In step S421, the error measurement unit 304 sends the error obtained in step S420 not only to the control unit 105 but also to the prediction unit 303. In step S422, the control unit 105 determines whether the error received from the error measurement unit 304 falls within a predetermined range. Upon determining that the error falls within the predetermined range, the process advances to step S423. If the error falls outside the predetermined range, the process advances to step S424. The predetermined range can be either a fixed range or a range that adaptively changes.

In step S423, the control unit 105 generates an encoding parameter to encode every region in the Nth frame image with the same image quality and sets the generated encoding parameter in the encoding unit 101. In this embodiment as well, the same quantization step is set for the Nth frame image.

On the other hand, in step S424, the prediction unit 303 corrects the estimated specific region of the Nth frame image using the error obtained by the error measurement unit 304. This correction process is done by, for example, causing the prediction unit 303 to hold the error history and, when the error in the frame exceeds the error in the preceding prediction, performing correction to make the estimated specific region closer to the detected specific region. However, the method is not limited to this. In addition, the correction process is not necessarily performed for the estimated specific region. For example, the predictive process of the prediction unit 303 may be corrected, and the prediction range or the search method may adaptively be changed in accordance with the error.

In step S425, the prediction unit 303 sends the region information of the corrected estimated specific region to the control unit 105. The control unit 105 thus generates, as the encoding parameter for the Nth frame image, an encoding parameter to encode the corrected estimated specific region with a higher image quality than that of the regions other than the estimated specific region. The control unit 105 sets the generated encoding parameter in the encoding unit 101.

In step S426, the encoding unit 101 generates encoded data by encoding the Nth frame image using the encoding parameter set by the control unit 105 and outputs the generated encoded data to an appropriate output destination. In step S427, the control unit 105 increments the value of a variable N by one to process the next frame.

In step S428, the control unit 105 determines whether the value of the variable N is equal to or smaller than the value of the total number NumOfFrame of frames of the moving image. Upon determining that N≤NumOfFrame, the process returns to step S402 to perform the subsequent process for the next frame image. If N>NumOfFrame, the process of the flowcharts of FIGS. 4A and 4B ends.

As described above, according to this embodiment even when a wrong region is predicted as a specific region, the wrong estimated specific region is corrected. This allows to more accurately increase the image quality of the specific region.

Third Embodiment

Figure 3:
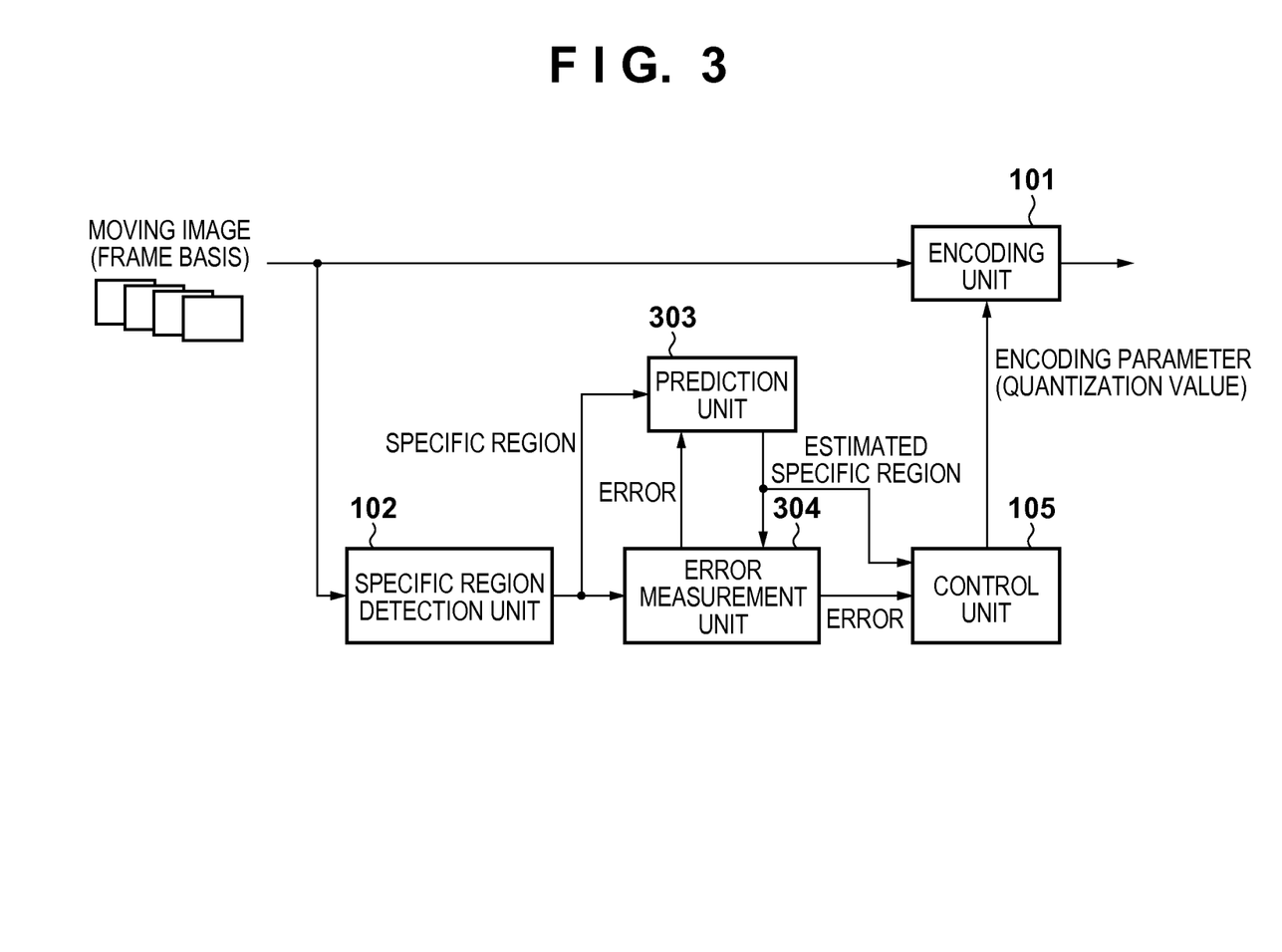
FIG. 3 is a block diagram showing an example of the functional arrangement of an image processing apparatus.

The units shown in FIGS. 1 and 3 can be formed from hardware. However, they may be implemented by a computer program. In this case, the computer program is stored in the memory of a computer. The CPU of the computer executes the computer program so that the computer functions as the image processing apparatus according to the first or second embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-131636 filed Jun. 13, 2011 which is hereby incorporated by reference herein in its entirety.

What is claimed is:

1. An image processing apparatus comprising:
an input unit configured to input a plurality of image frames included in moving image data;
a determination unit configured to determine a specific area in the input image frame based on a result of an object detection for the input image frame;
an estimation unit configured to estimate, by using a specific area in a first input image frame which is determined by the determination unit based on a result of an object detection for the first input image frame and a specific area in a second input image frame succeeding the first input image frame which is determined by the determination unit based on a result of an object detection for the second input image frame, a specific area in a third input image frame succeeding the second input image frame;
a specification unit configured to specify a difference between a specific area in the third input image frame which is determined by the determination unit based on a result of an object detection for the third input image frame and the specific area in the third input image frame which is estimated by the estimation unit by using the specific areas in the first and second input image frames; and a control unit configured to control a parameter for encoding a fourth input image frame succeeding the third input image frame based on the difference specified by the specification unit, such that a specific area being based on an estimation result of the estimation unit for the fourth input image frame is encoded with a higher image quality than other area in the fourth input image frame in a case where the difference specified by the specification unit for the third input image frame is smaller than a predetermined threshold.

2. A non-transitory computer-readable storage medium storing a computer program that causes a computer to function as each unit of the image processing apparatus of claim 1.

3. The apparatus according to claim 1, wherein in a case where the difference for the third input image frame is smaller than the predetermined threshold, said control unit sets a quantization step for the specific area being based on the estimation result of the estimation unit for the fourth input frame image to be smaller than a quantization step for areas other than the specific area being based on the estimation result of the estimation unit for the fourth input frame.

4. The apparatus according to claim 1, wherein the determination unit detects, as a result of the object detection, at least one of a human face, a human body, an animal face, and a license plate of a car.

5. An image processing apparatus comprising:
an input unit configured to input a plurality of image frames included in moving image data;
a determination unit configured to determine a specific area in the input image frame based on a result of an object detection for the input image frame;
an estimation unit configured to estimate, by using a specific area in a first input image frame which is determined by the determination unit based on a result of an object detection for the first input image frame and a specific area in a second input image frame succeeding the first input image frame which is determined by the determination unit based on a result of an object detection for the second input image frame, a specific area in a third input image frame succeeding the second input image frame;
a specification unit configured to specify a difference between a specific area in the third input image frame which is determined by the determination unit based on a result of an object detection for the third input image frame and the specific area in the third input image frame which is estimated by the estimation unit by using the specific areas in the first and second input image frames; and
a control unit configured to change, based on the difference specified by the specification unit, a specific area being based on an estimation result of the estimation unit for a fourth input image frame succeeding the third input image frame and to control a parameter for encoding the fourth input image frame such that the changed specific area is encoded with a higher image quality than other area in the fourth input image frame.

6. An image processing method comprising:
inputting a plurality of image frames included in moving image data;
determining a specific area in the input image frame based on a result of an object detection for the input image frame;
estimating, by using a specific area in a first input image frame which is determined by the determining based on a result of an object detection for the first input image frame and a specific area in a second input image frame succeeding the first input image frame which is determined by the determining based on a result of an object detection for the second input image frame, a specific area in a third input image frame succeeding the second input image frame;
specifying a difference between a specific area in the third input image frame which is determined by the determining based on a result of an object detection for the third input image frame and the specific area in the third input image frame which is estimated by the estimating by using the specific areas in the first and second input image frames; and
controlling a parameter for encoding a fourth input image frame succeeding the third input image frame based on the difference specified by the specifying, such that a specific area being based on an estimation result of the estimating for the fourth input image frame is encoded with a higher image quality than other area in the fourth input image frame in a case where the difference specified by the specifying for the third input image frame is smaller than a predetermined threshold.

7. The method according to claim 6, wherein the determining detects, as a result of the object detection, at least one of a human face, a human body, an animal face, and a license plate of a car.

8. An image processing method comprising:
inputting a plurality of image frames included in moving image data;
determining a specific area in the input image frame based on a result of an object detection for the input image frame;
estimating, by using a specific area in a first input image frame which is determined by the determining based on a result of an object detection for the first input image frame and a specific area in a second input image frame succeeding the first input image frame which is determined by the determining based on a result of an object detection for the second input image frame, a specific area in a third input image frame succeeding the second input image frame;
specifying a difference between a specific area in the third input image frame which is determined by the determining based on a result of an object detection for the third input image frame and the specific area in the third input image frame which is estimated by the estimating by using the specific areas in the first and second input image frames; and
changing, based on the difference specified by the specifying, a specific area being based on an estimation result of the estimating for a fourth input image frame succeeding the third input image frame and controlling a parameter for encoding the fourth input image frame such that the changed specific area is encoded with a higher image quality than other area in the fourth input image frame.

9. The method according to claim 6, wherein in a case where the difference for the third input image frame is smaller than the predetermined threshold, the controlling sets a quantization step for the specific area being based on the estimation result of the estimating for the fourth input frame image to be smaller than a quantization step for areas other than the specific area being based on the estimation result of the estimating for the fourth input frame.

* * * * *